Nov. 9, 1926.  1,606,048
J. SOSS
HINGE
Filed July 20, 1925
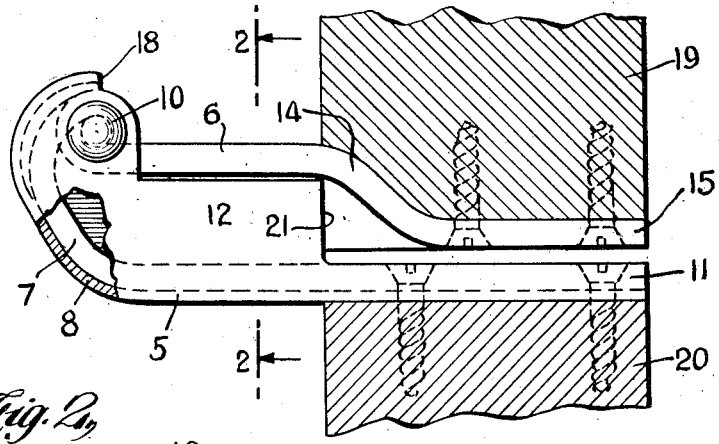
Fig.1,
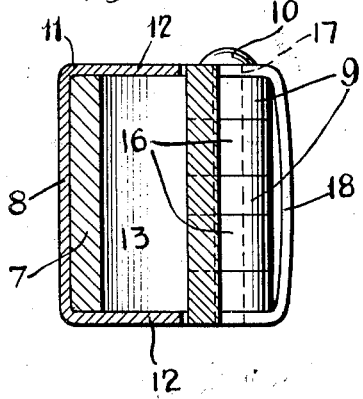
Fig.2,
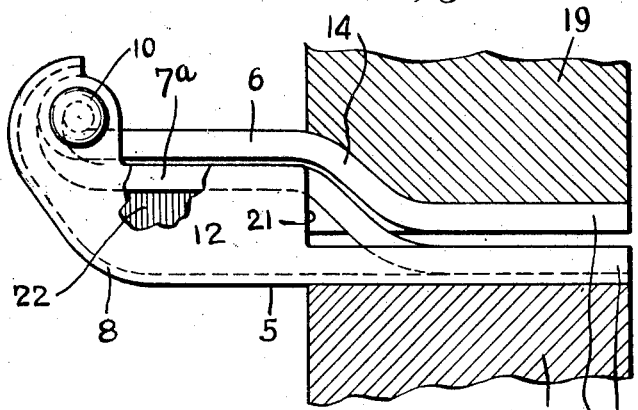
Fig.3,
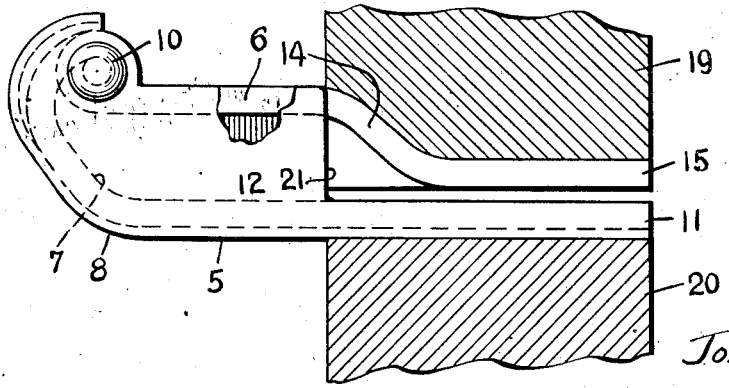
Fig.4,
INVENTOR
Joseph Soss
BY
ATTORNEY Patented Nov. 9, 1926.

1,606,048

UNITED STATES PATENT OFFICE.

JOSEPH SOSS, OF BROOKLYN, NEW YORK.

HINGE.

Application filed July 20, 1925. Serial No. 44,668.

This invention relates to hinges and particularly to what are known as covered joint hinges designed primarily for use in connection with motor vehicles and wherein one of the butts of the hinge is provided with a hood portion partially enclosing the hinge joint or the pintle bearing portion of the hinge; and the object of the invention is to provide a hinge of the class specified wherein the shank of one of the butts of the hinge is offset with relation to the shank of the other butt to provide between the separate butts and adjacent the pintle bearing portion thereof, a space, and the other butt being provided with extending flanges for forming an enclosure for the space between said butts; a still further object being to provide one of the butts of the hinge with extending flanges for reinforcing and strengthening the curved or hook-shaped end portion of the butt and to relieve the strain upon the pintle bearing portion thereof; a further object being to provide a hinge in which one of the butts of the hinge is composed of two sheet metal parts secured together to form a unitary construction and the other butt of the hinge being fashioned from sheet metal, and the shank of one part of the first named butt and the shank of the second named butt being offset; and with these and other objects in view, the invention consists in a hinge of the class and for the purpose specified, which is simple in construction, strong and durable in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a plan view of a hinge made according to my invention and showing the separate butts in closed relation and mounted in connection with suitable supports.

Fig. 2 is a section on the line 2—2 of Fig. 1.

Fig. 3 is a view similar to Fig. 1 but showing a modification; and,

Fig. 4 is a view similar to Figs. 1 and 3 and showing another modification.

In Figs 1 and 2 of the drawing, I have shown a hinge composed of two butts 5 and 6, the butt 5 being composed of two sheet metal parts 7 and 8, the part 7 being composed of comparatively heavy sheet metal fashioned at one end to form a substantially hook-shaped end portion terminating in three cylindrical pintle bearings 9 through which the pintle pin 10 passes. The part 8 constitutes a casing or shell composed of thinner sheet metal than the part 7 and the shank portion of which is U-shaped in form in cross section to provide flanges 11 which overlie the top and bottom edges of the part 7, and these flanges, adjacent the curved end portion of the butt 5 are extended to form covered plates 12 to enclose the top and bottom openings of a chamber 13 formed between the part 7 of the butt 5 and the adjacent portion of the butt 6, the butt 6 being offset as seen at 14 in the direction of the butt 5 to bring the attaching end portion 15 thereof in close proximity to the corresponding end portion of the butt 5 as seen in Fig. 1 of the drawing, and when the hinge is in closed position. The free end portion of the butt 6 is fashioned to form two cylindrical pintle bearings 16 which are adapted to be positioned between the pintle bearings 9 of the butt 5 as seen in Fig. 2 of the drawing.

It will be noted that that part of the cover plates 12 overlying the pintle bearings or knuckles 9 and 16 is apertured as seen at 17 to receive the pintle pin 10 and the curved hook-shaped end portion of the hood or casing 8 terminates in a shoulder 18 forming a stop for limiting the separation of the separate butts in the swinging of the door. In Fig. 1, 19 represents the door frame, and 20 the door, and it will be understood that the butts 5 and 6 may be secured to either support as may be desired. It will also be noted that the inner edges 21 of the plates 12 terminate adjacent the outer face of the door frame and door 19 and 20 to form a neat and finished appearance when the door is in a closed position.

It will be understood that the plates 12 in addition to serving as closure plates for the chamber or compartment 13 also provide a reinforcing structure bridging the pintle bearing portion of the butt 5 and the projecting portion of the shank of such butt to take up the strain or stress on the pintle bearing portion when the door is swung outwardly to its full extent and against the stop 18, and this reinforcement of the hinge is one of the distinctive features of the invention and serves to prevent the possible breaking of the hinge at the hook portion thereof or in offsetting the pintle bearing portion to bring the door out of alinement.

In Fig. 3 of the drawing, I have shown a modification in which I have substituted for the part 7 shown in Fig. 1 of the drawing, a part 7ª which is fashioned to conform with and extend in parallel relation to the general contour of the part 6 shown in Fig. 1, while the part or casing 8 is of the same general form as the part 8 shown in Fig. 1; and with this construction, the plates 12 form an enclosure for a chamber 22 contained within the butt 5 between the adjacent faces of the part 7ª and 8 at the curved end portion of the hinge. Aside from the foregoing, the construction of the hinge shown in Fig. 3 is identical with that shown in Figs. 1 and 2.

In Fig. 4 of the drawing, I have shown another modification in which the cover plates 12 are extended to overlie the upper and lower edges of the butt 6 when the hinge is in closed position, thus providing a greater reinforcement of the pintle bearing end portion of the butt and also concealing both of the hinge butts within the casing 5 when in closed position, but aside from this modified feature, the construction is the same as that shown in Figs. 1 and 2.

In hinges of the class specified, it is desirable to provide, at times, a material offset of the pintle pin location with respect to the longitudinal plane of the hinge or that part of the hinge attached to the door and door frame. To provide a hinge of this class of the greatest strength, I preferably offset the hinge butt 6 in the manner herein shown and described and construct the butt 7 in such manner as to conform with the formation of the butt 6 and to form an enclosure for the top and bottom of an opening or chamber formed between the spaced butts or the spaced parts of one of the butts; and in addition to the foregoing it is also desirable in a hinge offset to the degree illustrated, to reinforce and give greater strength to the pintle bearing portion of the hinge to prevent the possible offsetting of the pintle bearing portion of the hinge or the breakage thereof.

It will be understood that I am not necessarily limited to the specific shape and form of the separate butts herein shown and described, and various other changes in and modifications of the construction herein set out may be made within the scope of the appended claims without departing from the spirit of my invention or sacrificing its advantages.

Having fully described my invention, what I claim as new and desire to secure by Letters Patent, is:—

1. A hinge composed of two butts movably connected by a pintle pin, the shank of one of said butts being offset with relation to a longitudinal plane through the shank of the other butt to form a space between said butts, and the other of said butts being composed of two butt members, one of which is provided with projecting flanges forming closure plates for the top and bottom of said space.

2. A hinge composed of two butts movably connected by a pintle pin, one of said butts being hook-shaped in form to offset the pintle bearing portion thereof with relation to the longitudinal plane of the shank, means extending between the offset pintle bearing portion of said butt and the central portion of the shank for reinforcing and strengthening the pintle bearing portion of the butt, and the shank of the other of said butts being offset and arranged in substantially parallel relation to the shank of the other butt to form adjacent the pintle bearing portion of the hinge, a chamber between the adjacent faces of the separate butts.

3. A hinge composed of two butts movably connected by a pintle pin, one of said butts being hook-shaped in form to offset the pintle bearing portion thereof with relation to the longitudinal plane of the shank, means extending between the offset pintle bearing portion of said butt and the central portion of the shank for reinforcing and strengthening the pintle bearing portion of the butt, the shank of the other of said butts being offset and arranged in substantially parallel relation to the shank of the other butt to form, adjacent the pintle bearing portion of the hinge, a chamber between the adjacent faces of the separate butts, and said means forming enclosures for the top and bottom of said chamber.

4. In a hinge, one of the butts of which is fashioned from sheet metal and composed of two independently formed parts, one of said parts constituting a casing or jacket for the other part and being secured thereto to form a unitary structure of said parts, one end portion of said butt and the separate parts thereof being fashioned into hook formation and provided with pintle bearings, and said casing or jacket being provided at the top and bottom thereof with projecting flanges bridging the space between the pintle bearing portion of said butt and the central portion of the shank thereof to reinforce and strengthen the pintle bearing portion of said butt, the outer edges of said flanges, throughout the major portion of their length, extending in parallel relation to the straight central portion of the butt.

5. In a hinge, one of the butts of which is fashioned from sheet metal and composed of two independently formed parts, one of said parts constituting a casing or jacket for the other part and being secured thereto to form a unitary structure of said parts, one end portion of said butt and the separate parts thereof being fashioned into hook formation and provided with pintle bearings, said casing or jacket being provided at the top and bottom thereof with projecting flanges bridging the space between the pintle bearing portion of said butt and the entral portion of the shank thereof to reinforce and strengthen the pintle bearing portion of said butt, the outer edges of said flanges, throughout the major portion of their length, extending in parallel relation to the straight central portion of the butt and the other butt being fashioned from sheet metal and the shank portion of which is offset to form at the pintle end portion of the hinge and between the adjacent faces of the butt, a subsubstantially rectangular chamber, closed at the top and bottom by the projecting flanges of the first named butt.

6. A hinge composed of two hinge butts, one of said butts being fashioned to form a hook-shaped end portion having pintle bearings and a shank portion, the shank of which is offset with relation to the pintle bearing portion of said butt, the other butt of the hinge being provided at one end with pintle bearings interengaging those of the first named butt, and the shank of the second named butt being offset whereby the attaching end portion thereof normally lies adjacent the corresponding end portion of the first named butt and in parallelism therewith while the other or pintle bearing portion of said butt is in parallel relation to the corresponding straight end portion of the first named butt and in spaced relation thereto to form a chamber between the adjacent faces of said butts, and means on one of said butts for forming closures for the top and bottom of said chamber.

7. A hinge composed of two hinge butts, one of said butts being fashioned to form a hook-shaped end portion having pintle bearings and a shank portion, the shank of which is offset with relation to the pintle bearing portion of said butt, the other butt, of the hinge being provided at one end with pintle bearings interengaging those of the first named butt, and the shank of the second named butt being offset whereby the attaching end portion thereof normally lies adjacent the corresponding end portion of the first named butt and in parallelism therewith while the other or pintle bearing portion of said butt is in parallel relation to the corresponding straight end portion of the first named butt and in spaced relation thereto to form a chamber between the adjacent faces of said butts, means on one of said butts for forming closures for the top and bottom of said chamber, and said first named butt being composed of separate parts, one of which constitutes a casing or jacket for the other part.

8. A hinge composed of two sheet metal butts comprising attaching end portions adapted to be secured to stationary and swinging members respectively, and pintle bearing portions, the pintle bearing portion being offset with relation to one of said butts by curving the outer end portion thereof with respect to the shank intermediate the pintle bearing portion and the attaching portion of said butt, the corresponding intermediate portion of the other butt extending directly from the pintle bearing and in spaced and parallel relation to the intermediate portion of the first named butt when the hinge is in closed position, and the attaching portion of the shanks of the separate butts being adjacent and in substantially parallel relation.

In testimony that I claim the foregoing as my invention I have signed my name this 10th day of July, 1925.

JOSEPH SOSS.